(No Model.)

A. WOOD.
SPRING COUPLING.

No. 309,908. Patented Dec. 30, 1884.

WITNESSES:
Fred N. Stevens,
Arthur C. Denison.

INVENTOR
Arthur Wood
BY Edward Taggart
His ATTORNEY

UNITED STATES PATENT OFFICE.

ARTHUR WOOD, OF GRAND RAPIDS, MICHIGAN.

SPRING-COUPLING.

SPECIFICATION forming part of Letters Patent No. 309,908, dated December 30, 1884.

Application filed September 27, 1884. (No model.)

*To all whom it may concern:*

Be it known that I, ARTHUR WOOD, a citizen of the United States, residing at the city of Grand Rapids, in the county of Kent and State of Michigan, have invented a new and useful Coupling for Coupling Springs, of which the following is a specification.

My invention relates to a metallic coupling device used in connection with buggy and other springs for the purpose of attaching or connecting the springs together; and the object of my invention is to simplify and cheapen the coupling of springs, as hereinafter set forth. This object I accomplish by means of the mechanism illustrated in the accompanying drawings, in which—

Figure 1:
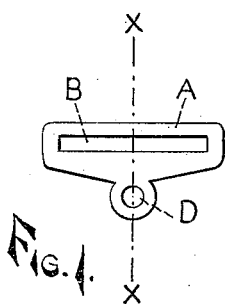
Figure 2:
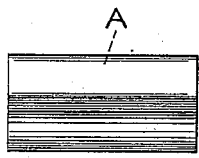
Figure 3:
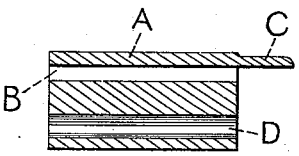
Figure 4:
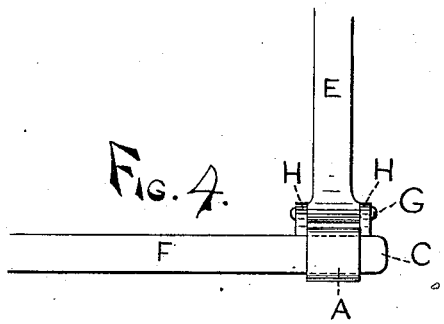
Figure 5:
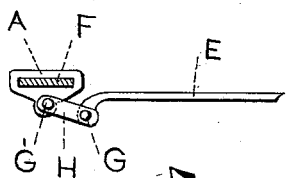

Figure 1 is an end view of my coupling device; Fig. 2, a side view of the same. Fig. 3 is a vertical sectional view of the same on line *x x* of Fig. 1. Fig. 4 is a plan view showing the method of coupling the two springs, and Fig. 5 is a side view of the coupling.

Similar letters refer to similar parts throughout the several views.

A is the metallic coupling-iron. B is an opening in the coupling A for the reception of the front spring, F. C is a projection on the coupling device A, to which the spring F is or may be attached. D is an opening in the part A for the reception of the bolt G'. E is the side spring. H H are links connecting A to the side spring, E, as shown in Fig. 5. G is a bolt attaching links H H to side spring, E.

The construction of the side and front springs is the same as of those now in general use.

Having thus described my invention, what I claim to have invented, and desire to secure by Letters Patent, is—

1. The coupling-iron A, provided with the slot B, hole D, and projection or lip C, in combination with the spring F, substantially as described.

2. The combination of the coupling-iron A, constructed as described, with the spring F, links H H, and spring E, all as described.

ARTHUR WOOD.

Witnesses:
 ABIEL E. WILSON,
 ARTHUR C. DENISON.